United States Patent [19]

Lo

[11] Patent Number: 4,897,440
[45] Date of Patent: Jan. 30, 1990

[54] ABRASION RESISTANT HULLING ROLLS FROM CARBOXYLATED NITRILE RUBBER

[76] Inventor: Ching-Tsan Lo, 18010 Oakworth Dr., Houston, Tex. 77084

[21] Appl. No.: 163,465

[22] Filed: Mar. 3, 1988

[51] Int. Cl.$^4$ .......................... C08K 5/36; C08C 19/20; B02B 3/00
[52] U.S. Cl. ....................................... 524/521; 29/130; 29/132; 99/617; 524/566; 525/233; 525/234
[58] Field of Search ............... 525/192, 194, 195, 233, 525/234, 329.3; 524/521, 526, 565, 566

[56] References Cited

U.S. PATENT DOCUMENTS

| | | | |
|---|---|---|---|
| 4,259,460 | 3/1981 | Schwarz | 525/208 |
| 4,409,365 | 10/1983 | Coran | 525/78 |
| 4,421,884 | 12/1983 | Oyama | 525/209 |
| 4,426,921 | 1/1984 | Meinardus | 99/519 |

Primary Examiner—Christopher Henderson

[57] ABSTRACT

An improved, abrasion-resistant rice hulling roll comprises a core with coating of a nitrile rubber compound, particularly a carboxylated nitrile rubber compound. The hulling rolls of this invention are characterized by substantially improved wear life as compared to conventional rolls made of styrene-butadiene rubber (SBR). The nitrile rubbers are also useful in other wear-resistant applications.

20 Claims, No Drawings

ABRASION RESISTANT HULLING ROLLS FROM CARBOXYLATED NITRILE RUBBER

BACKGROUND OF THE INVENTION

1. Field of the Invention

This invention relates to improved rubber products with better abrasion resistance. More particularly, this invention concerns the use of nitrile rubbers, in particularly, carboxylated nitrile rubbers with proper additives to make long life rubber products, e.g., rice hulling rolls.

2. Brief Description of the Prior Art

It is known in the art that current hulling rolls are made of styrene-butadiene rubber (SBR) with proper additives. Typically SBR needs sulfur, accelerators, antioxidants, antiozonants, activators, fillers, and softeners or extenders. The ingredients are mixed in internal mixers or on mills, and calendered, molded and cured in conventional equipment. Mixing procedures vary with the compounds. In general, the rubber, zinc oxides, antioxidant, and stearic acid are mixed; then the filler is added in portions with the softeners or oil. For rice hulling rolls, in order to maintain the quality of the rice, Hi-Sil is usually used as the filler instead of carbon black. It is general practice to dump and cool the batch. The second phase includes mixing in all the other ingredients, with the accelerator and sulfur being added last. Mixing is continued until the sulfur is well dispersed. The hulling rolls are usually produced from stock. First the core must be carefully applied to the core and rolled down by machine or by hand. Special care must be taken to prevent the incorporation of air into the roll either between the plies or as blisters in the calendered stock. The roll is built to sufficient size to allow it to be ground to a smooth surface at the desired diameter. The built roll is then wrapped tightly with nylon tape for vulcanization in an open steam. The vulcanized roll, after cooled, is machined to the proper size. The SBR rubber roll made as described above is currently used in all the rice mills. It is obvious that the rice hulling depends on abrasion to strip the rice shell. Further, in the hulling process, heat is generated. It is well known that the SBR roll does not have good heat resistance. When the shelling temperature is increased, the roll life will be decreased.

SUMMARY OF THE INVENTION

It is accordingly one object of the invention to provide a rubber roll with improved abrasion resistance and thermal resistance. Other objects and advantages of the present invention will become apparent as the description proceeds.

In satisfaction of the foregoing objects and advantages, this invention provides a class of rubber compounds, noticeably, nitrile rubber compounds, particularly carboxylated nitrile rubber compounds, to fulfill the necessary enhancements.

DESCRIPTION OF THE PREFERRED EMBODIMENTS

The present invention involves the use of nitrile rubbers, more importantly carboxylated nitrile rubbers in the manufacture of rice hulling rolls.

Nitrile rubbers have excellent abrasion resistance. And the additional carboxyl groups in the carboxylated nitrile rubbers enhance the abrasion resistance even at elevated temperature. The vulcanized nitrile rubber compounds also have superior heat resistance. Therefore, the nitrile rubber compounds, particularly carboxylated nitrile rubber compounds, should be excellent products to be used as hulling rolls, e.g., rice hulling rolls.

Nitrile rubbers are amorphous like SBR, need reinforcement by fillers in order to obtain optimum properties. These fillers may be carbon black or mineral types. Carbon blacks give the best balanced reinforcement; but mineral fillers are used where colors other than black are required, for example, for the purpose of rice hulling. In addition, plasticizers, tackifiers, and processing aids may be added to improve the flow or knitting characteristics of the compounds. A plasticizer may further secure some end product properties. Antioxidants and activators may also be added to improve scorching phenomena. Also, pigmentary filler may be added to provide desirable color. Further other elastomers may be added to reduce cost and/or to improve the processing characteristics.

Nitrile rubber compounds are vulcanized in essentially the same manner as SBR and natural rubbers. Sulfur is usually used as vulcanizer. However, sulfur is less soluble in nitrile rubber than in SBR or natural rubber, an increase in accelerator is required. Carboxylated nitrile rubbers are vulcanized in a manner similar to standard nitrile rubbers plus the additional reaction of the acid groups. Zinc oxides or magnesium oxides can be used to react with the acid group. If the reaction is too fast and scorch problems are encountered, special types of zinc oxides or magnesium oxides can be used to slow down the reaction.

In accordance with this invention, there are provided rice hulling rolls of abrasion resistant nitrile rubber compounds, particularly carboxylated nitrile rubber compounds, which comprise: carboxylated nitrile rubber from 50 parts to 100 parts made up with other elastomers, which can be other nitrile rubbers, styrene-butadiene rubbers, or natural rubbers, to have 100 parts total rubber by weight. The filler is 0 to 150 parts, preferably 20 to 120 parts. The plasticizer is 0 to 35 parts. The tackifier is 0 to 35 parts. The processing aid is 0 to 5 parts. The antioxidant is 0 to 7 parts. The activator is 0 to 7 parts. The vulcanizer is 0.5 to 7 parts. The accelerator is 0 to 10 parts. A combination of zinc oxides and magnesium oxides is used in the amount of 1 to 25 parts, preferable 2 to 15 parts. If necessary, 0 to 20 parts of pigmentary filler may be added. Note that the formulation is described based on 100 parts of total elastomers, and given in parts by weight.

The following examples are presented to illustrate the invention but are not to be considered as limited thereto. Again in the examples and throughout this specification, parts are by weight unless otherwise indicated.

EXAMPLE I

The following samples illustrate the excellence of the nitrile rubber, particularly the carboxylated nitrile rubber, in the abrasion resistance.

TABLE I

| Sample No. | 1A | 1B | 1C |
|---|---|---|---|
| | | Parts by Weight | |
| Chemigum NX775 | 100 | 75 | 75 |
| Chemigum N683B | — | 25 | — |
| SBR 1502 | — | — | 25 |
| Hi-Sil 215 | 30 | 30 | 30 |

TABLE I-continued

| Sample No. | 1A | 1B | 1C |
|---|---|---|---|
| | Parts by Weight | | |
| Hi-Sil EP | 20 | 20 | 20 |
| Diisodecyl phthalate | 5 | 5 | 5 |
| Durez 31802 | 12 | 12 | 12 |
| Oleic Acid | 3 | 3 | 3 |
| Wingstay L | 2 | 2 | 2 |
| PASCO 558T | 5 | 5 | 5 |
| Unads | 1.5 | 1.5 | 1.5 |
| Sulfur, spider brand | 1.5 | 1.5 | 1.5 |
| Wingstay 100 | 0.5 | 0.5 | 0.5 |
| HEXA powder | 0.75 | 0.75 | 0.75 |

Chemigum is the trade name of nitrile rubber produced by Goodyear Rubber & Tire Company. Chemigum NX775 is a carboxylated nitrile rubber while Chemigum N683B is one kind of the nitrile rubbers. Durez is a phenol formaldehyde polymer which is a good tackifier for nitrile rubbers and HEXA powder is hexamethylenetetramine which is a phenolic resin accelerator. HEXA powder is added to provided additional cross-link reaction with the tackifier, Durez 31802. Both HEXA powder and Durez 31802 (Phenol Formaldehyde polymer) can be obtained from Occidental Chemical Company. Wingstay L is an antioxidant (Reaction product of para-cresol & dicyclo-pentadiene). It is a product of Goodyear Rubber & Tire Company. PASCO 558T is a zinc oxide, and can be obtained from Harwick Chemical Corporation. Unads is the trade name of tetramethylthiuram monosulfide. It is a good accelerator for nitrile rubber vulcanization, and can be obtained from R. T. Vanderbilt Company. Hi-Sil is precipitated hydrated amorphous silica. Wingstay 100 is mixed diaryl p-phenylenediamine. The source of the other chemicals can be found in the "Blue Book" of Rubber World Magazine.

The above formulas were mixed and vulcanized. The following properties were detected:

| Sample | 1A | 1B | 1C |
|---|---|---|---|
| Hardness, Shore A | 91 | 90 | 91 |
| PICO Abrasion Index | 665 | 438 | 175 |

EXAMPLE II

The following samples illustrate that various additives can be used.

TABLE II

| Sample | 2A | 2B |
|---|---|---|
| | Parts by Weight | |
| Chemigum NX775 | 100 | 85 |
| Budene | — | 15 |
| Cab-O-Sil M5, densed | 10 | 10 |
| Hi-Sil EP | 40 | 40 |
| Titanium Dioxide | 10 | 10 |
| DSC-18 | 0.5 | 0.5 |
| Stearic Acid | 2 | 2 |
| Sunolite 240 | 1.5 | 1.5 |
| Dioctyl Phthalate | 25 | 25 |
| Santicizer 8 | 5 | 5 |
| Wingstay L | 2 | 2 |
| PASCO 558T | 6 | 6 |
| Unads | 2.5 | 2.5 |
| Sulfur, spider brand | 1.5 | 1.5 |
| Methyl Tuads | 0.25 | 0.25 |

Budene is the trade name of polybutadiene produced by Goodyear Rubber & Tire Company. DSC-18 is mercapto-silane coupling agent, and can be obtained from Harwich Company. Stearic acid is an activator; also has the function of plasticizer and softener. Sunolite 240, a blend of petroleum waxes, is an antioxidant agent, and can be obtained from Witco Chemical Company. Santicizer 8 is a sulfonamide type plasticizer and softener produced by Monsanto Company. Methyl tuads is the trade name of tetramethylthiuram disulfide. Similar to unads, it is a good accelerator for nitrile rubber vulcanization, and can be obtained from R. T. Vanderbilt Company. Wingstay L is an antioxidant. It is a product of Goodyear Rubber & Tire Company. Hi-Sil is precipitated hydrated amorphous silica. Cab-o-sl is fumed colloidal silica. The source of the other chemicals either has been discussed or can be found in the "Blue Book" of Rubber World Magazine.

The above formulas were mixed and vulcanized. The following properties were detected:

| Sample | 2A | 2B |
|---|---|---|
| Hardness, Shore A | 77 | 78 |
| PICO Abrasion Index | 213 | 149 |

Note that the plasticizer content in the samples in Example II is much higher than that in the samples in Example I, and titanium dioxide, a pigmentary filler, is also included.

EXAMPLE III

Based on the results shown in Examples I and II, the following formula is chosen for the field test.

TABLE III

| Sample | Parts by Weight 3 |
|---|---|
| Chemigum NX775 | 100 |
| Hi-Sil 233 | 50 |
| Diisodecyl phthalate | 5 |
| Durez 31802 | 12 |
| Oleic Acid | 3 |
| Wingstay L | 2 |
| PASCO 558T | 6 |
| Unads | 1.5 |
| Sulfur, spider brand | 1.5 |
| Wingstay 100 | 0.5 |
| HEXA poWder | 1.0 |

Hi-Sil 233 is used only because of the availability at the time of test. The formula is mixed and used to make rice hulling rolls. The rolls are vulcanized and consumed in rice milling machine. These rolls last must longer than the rolls, which are made of SBR compounds, currently used by the rice milling plants.

The composition of this invention may be further formulated with a wide variety of elastomers, fillers, plasticizers, tackifiers, processing aids, antioxidants, pigmentary fillers, accelerators, vulcanizers and other ingredients.

In view of the foregoing description and examples, it will become apparent to those of ordinary skill in the art that equivalent modifications thereof may be used without departing from the spirit and scope of this invention.

I claim:

1. An abrasion resistant hulling roll comprising a solid supporting core and a covering consisting essentially of rubber composition comprising carboxylated nitrile rubber 50–100 parts by weight admixed with up to 50 parts by weight of other elastomers, said composition conjugated diene totaling 100 parts, in admixture with effective amounts, of a filler, a plasticizer, a tackifier, an antioxidant, a sulfur vulcanizer compound, an accelerator, and zinc oxide.

2. An abrasion resistant hulling roll according to claim 1 in which
said filler is present in 20-120 parts,
said plasticizer is present in up to 35 parts,
said tackifier is present in up to 35 parts,
said antioxidant is present in up to 7 parts,
said vulcanizer is present in up to 7 parts, said zinc oxide is present in 2-15 parts,
said composition being based on 100 parts of rubber.

3. An abrasion resistant hulling roll according to claim 1 in which
said filler is present in up to 150 parts,
said plasticizer is present in up to 35 parts,
said tackifier is present in up to 35 parts,
said antioxidant is present in up to 7 parts,
said vulcanizer is present in up to 7 parts,
said zinc oxide is present in up to 25 parts,
said composition being based on 100 parts of rubber.

4. An abrasion resistant hulling roll according to claim 3 additionally including
magnesium oxide, said zinc and magnesium oxides totaling up to 25 parts.

5. An abrasion resistant hulling roll according to claim 1 in which
said elastomer consists of a member selected from the group consisting of nitrile rubber, styrene-butadiene rubbers and natural rubber and mixtures thereof.

6. An abrasion resistant hulling roll according to claim 1 in which
said filler is carbon black or silica.

7. An abrasion resistant hulling roll according to claim 1 in which
said plasticizer is diisodecyl phthalate, dioctyl phthalate, or sulfonamide.

8. An abrasion resistant hulling roll according to claim 1 in which
said tackifier is a phenol formaldehyde polymer or a mercapto-silane coupling agent.

9. An abrasion resistant hulling roll according to claim 1 in which
said antioxidant is a mixed diaryl p-phenylenediamine, a reaction product of para-cresol and dicyclo-pentadiene or a blend of petroleum waxes.

10. An abrasion resistant hulling roll according to claim 1 including
an activator consisting essentially of oleic acid, stearic acid or mixtures thereof.

11. An abrasion resistant hulling roll according to claim 1 in which
said sulfur vulcanizing compound is sulfur.

12. An abrasion resistant hulling roll according to claim 1 in which
said accelerator is tetramethylthiuram monosulfide or tetramethylthiuram disulfide.

13. An abrasion resistant hulling roll according to claim 1 including
up to 5 parts of a processing aid effective for nitrile rubbers.

14. An abrasion resistant hulling roll according to claim 1 including
a pigmentary filler in an effective amount up to 20 parts based on 100 parts total elastomers.

15. An abrasion resistant hulling roll according to claim 14 in which
said pigmentary filler is titanium dioxide.

16. An abrasion resistant hulling roll according to claim 1 in which
said filler is silica.

17. An abrasion resistant hulling roll according to claim 1 in which
said tackifier is a phenol-formaldehyde resin.

18. An abrasion resistant hulling roll according to claim 1 including
a tackifier accelerator.

19. An abrasion resistant hulling roll according to claim 17 including
a tackifier accelerator comprising hexamethylenetetramine.

20. An abrasion resistant hulling roll according to claim 1 in which
said antioxidant is a mixture of a mixed diaryl p-phenylenediamine and a reaction product of para-cresol and dicyclo-pentadiene.

* * * * *